July 16, 1935.  M. NYSTROM  2,008,033
REPRODUCING MACHINE FOR FILM RECORDS
Filed Aug. 26, 1931   9 Sheets-Sheet 1

Fig. 1.

Inventor
Martin Nystrom
By Harris D. Hineline Atty.

July 16, 1935.  M. NYSTROM  2,008,033
REPRODUCING MACHINE FOR FILM RECORDS
Filed Aug. 26, 1931   9 Sheets-Sheet 2

Inventor
Martin Nystrom
By Harris D. Hineline Atty.

July 16, 1935.

M. NYSTROM 2,008,033

REPRODUCING MACHINE FOR FILM RECORDS

Filed Aug. 26, 1931

Inventor
Martin Nystrom
By Harris D Hineline Atty

July 16, 1935.  M. NYSTROM  2,008,033
REPRODUCING MACHINE FOR FILM RECORDS
Filed Aug. 26, 1931   9 Sheets-Sheet 6

Fig. 8.

Inventor
Martin Nystrom
By Harris D. Hineline Atty.

July 16, 1935.  M. NYSTROM  2,008,033
REPRODUCING MACHINE FOR FILM RECORDS
Filed Aug. 26, 1931  9 Sheets-Sheet 8

Inventor
Martin Nystrom
By Harris D. Hineline Atty.

July 16, 1935.  M. NYSTROM  2,008,033
REPRODUCING MACHINE FOR FILM RECORDS
Filed Aug. 26, 1931   9 Sheets-Sheet 9

Inventor
Martin Nystrom
By Harris D. Hineline, Atty.

Patented July 16, 1935

2,008,033

UNITED STATES PATENT OFFICE 2,008,033

REPRODUCING MACHINE FOR FILM RECORDS

Martin Nystrom, Chicago, Ill., assignor to United Research Corporation, a corporation of Delaware Application August 26, 1931, Serial No. 559,392

22 Claims. (Cl. 88—16)

My invention relates to a reproducing machine for film records and particularly to a removable film magazine for the machine.

Heretofore it has been the practice for those who use film reproducing machines for home entertainment to rent films from commercial agencies having "film libraries". A factor tending to make this custom expensive has been the damage to films by inexperienced or careless operators of the projectors. It is an object of my invention to effect an economy in this particular by providing a closed casing or magazine for the films to prevent the operator from needlessly tampering with them.

It is another object of my invention to provide mechanism for counting the number of times a particular film is used so that the operator may be charged accordingly by those who rent them out. As formerly it was impossible to determine the number of times a film had been projected, a larger fee had to be charged than would be necessary for a single exhibition. Formerly also the operator was apt to exhibit a film more frequently than was really necessary as the additional showings did not cost him additional fees. With my apparatus therefore the wear and tear of films incidental to unnecessary exhibitions will be eliminated.

A further object of my invention is to provide counting mechanism of the type referred to associated with picture film feed mechanism in which it is unnecessary to rewind the film after pictures have been exhibited but rather during the projecting operation the film is prepared for further exhibiting.

A further object of the invention is to prevent the empty spool in a film magazine from being associated with the reproducing machine in film feeding position.

A further object of the invention is to store in a pocket in a removable magazine, a loop of film to be threaded through the machine.

A further object of the invention is to accommodate on the machine a magazine in reversible positions to permit the reproduction of a plurality of series of records. Preferably, this is accomplished while preventing the magazine from being improperly positioned on the machine, and/or while automatically stopping the machine when the end of the record is reached.

Other objects and advantages will appear as the description proceeds.

Referring to the accompanying drawings.

Referring more particularly to the drawings, a motor 1 and most of the parts of the projecting mechanism are housed within a cabinet 2, on the front panel 3 of which is mounted a casing 4 constituting a magazine for a film 5. A lid 6 on the cabinet 2 overlies a turntable 7 for the playing of phonograph records as an accompaniment to the exhibition.

The casing 4 is portable as an independent unit (Fig. 8) and has a cover 8 (Fig. 9) provided with a peripheral flange 10. For securing the cover 8 a pair of lugs 11 on the flange 10 are disposed in openings 12 inside of the casing 4 and a lock 13 on the cover has a bolt 14 which is received in a keeper 15 in a spacing sleeve 16 secured to the casing 4 and extending between it and the cover 8.

The lock 13 may be turned by a key (not shown) which ordinarily will be retained by the "film library" or other agency which distributes the films.

The casing 4 is supported on the cabinet by a pair of studs 17 which are mounted on standards 18 resting on a base 19 which also supports the motor 1. The studs 17 extend through spacing sleeves 16 and 20 and at their ends are provided with heads 21 which may be moved manually into locked or unlocked position and when locked are retained in this condition by pistons 22 which are held in engagement with the heads 21 by springs 23.

The film 5 is secured to spools 24 and 25 each comprising side plates connected by a cylinder 26.

As illustrated the spool 24 is in position to be unwound. Its side plates have apertures 27 which receive a spindle 28 extending through holes 29 in the casing 4. A key 30 is pivotally mounted in a slot 31 in the spindle 28 and is forced outwardly by a spring 32 and into one of a pair of notches 33 so that the spindle 28 will be caused to rotate with the spool 24.

The spindle 28 is journaled in a bearing 34 on a standard 35 secured to the base 19 and has a head 36 against which a compression spring 37 bears, the spring 37 holding a friction washer 38 in engagement with the bearing 34 so as to put a slight drag on the spool 24 as it is unwound.

The spool 24 is prevented from moving longitudinally of the spindle 28 by circular corrugations 39 on the casing 4 and its cover 8.

Figures 16, 17, 18:
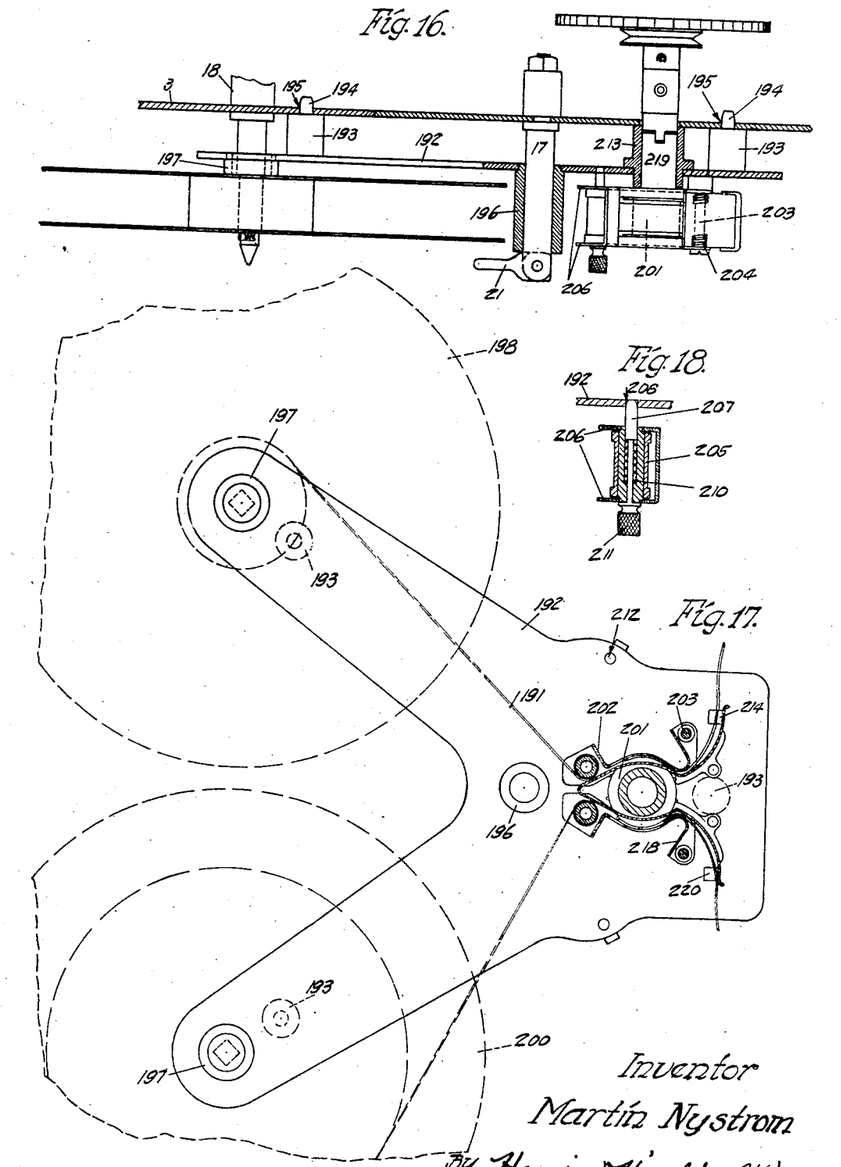
Fig. 16 is a horizontal sectional view of an adapter for the exhibiting of single films showing also in section the front panel of the machine illustrated in Figs. 1 to 15 inc.
Fig. 17 is detail elevational view of the adapter shown in Fig. 16, film feeding mechanism being illustrated in section.
Fig. 18 is a sectional view of a guide roller and associated parts in the adapter.

The outer portion of the spindle 28 is square in cross section to adapt it for use also with a standard film spool (Fig. 16).

Figure 4:
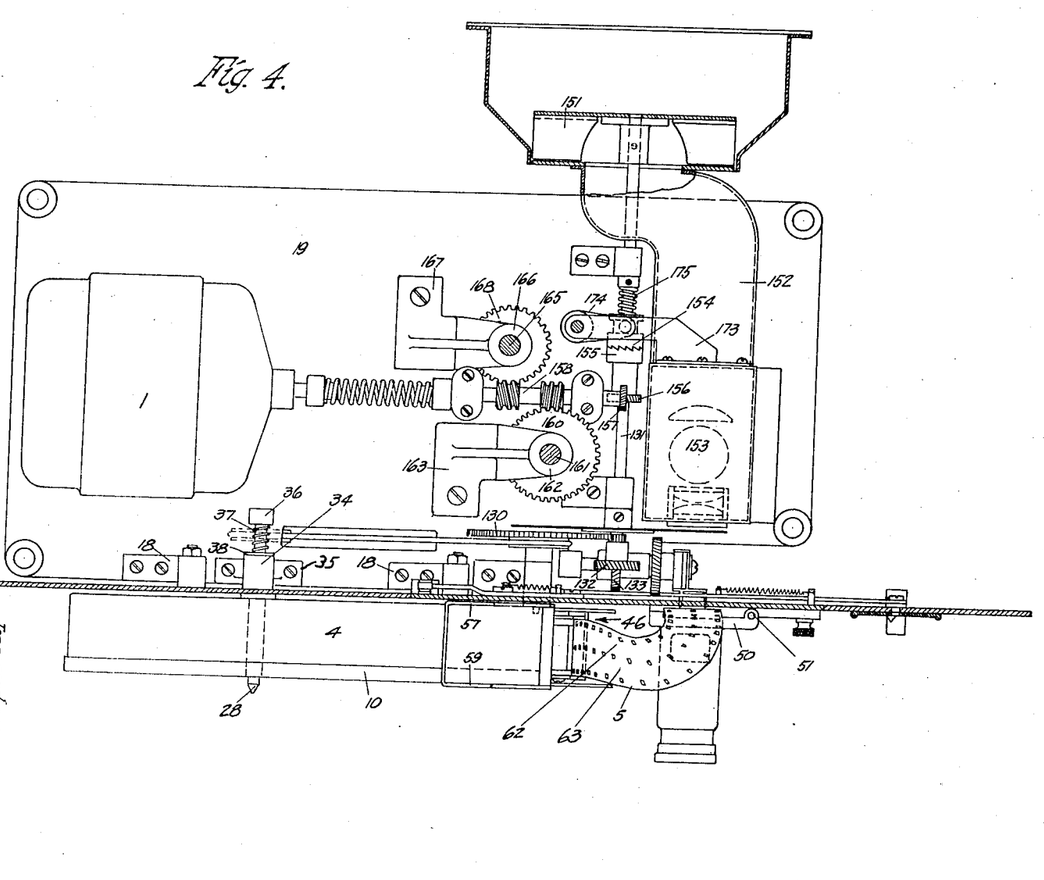
Figs. 4, 5, 7 and 9 are sectional views taken on the lines IV—IV, V—V, VII—VII and IX—IX respectively of Fig. 1.
Figures 12, 14:
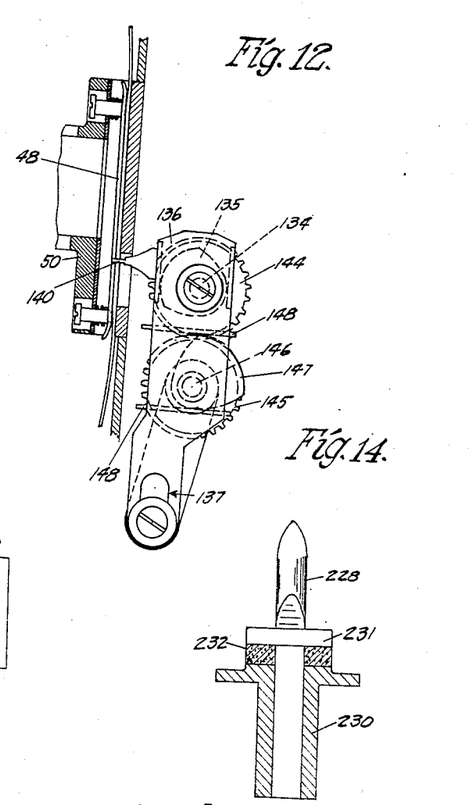
Fig. 12 is a fragmentary view showing intermittent film feed mechanism in elevation and adjacent portions of the aperture gate in section.
Fig. 14 is a detail view of a spindle and a bearing therefor constituting a portion of film rewinding mechanism.

The film 5 extends from the spool 24 underneath guide rollers 40 and 41 (Figs. 8 and 10) over a sprocket drum 42 and upwardly between guides 43 and 44 the latter having lugs 45 (Figs. 4 and 8) engaging the edge of the film 5. Thence the film 5 extends out of an opening 46 in the casing 4 and is looped upwardly and then descends behind a roller 47 and between the panel 3 and a shoe 48 (Fig. 12). The shoe 48 is carried by the aperture gate 50 which is hinged to the panel 3 at 51.

The film 5 extends downwardly behind a roller 52 and is formed into a loop, and reenters the casing 4 being guided to and along the sprocket drum 42 by guiding devices similar to those described as being above the drum 42.

The guide roller 40 rotates on a stud 53 which is connected by a guide plate 54 to a stud 55 for a roller 56, the guide plate 54 serving to prevent the accidental escape of the film 5 from its proper course.

From the roller 56 the film 5 travels to the spool 25 on which it is being wound.

Figure 8:
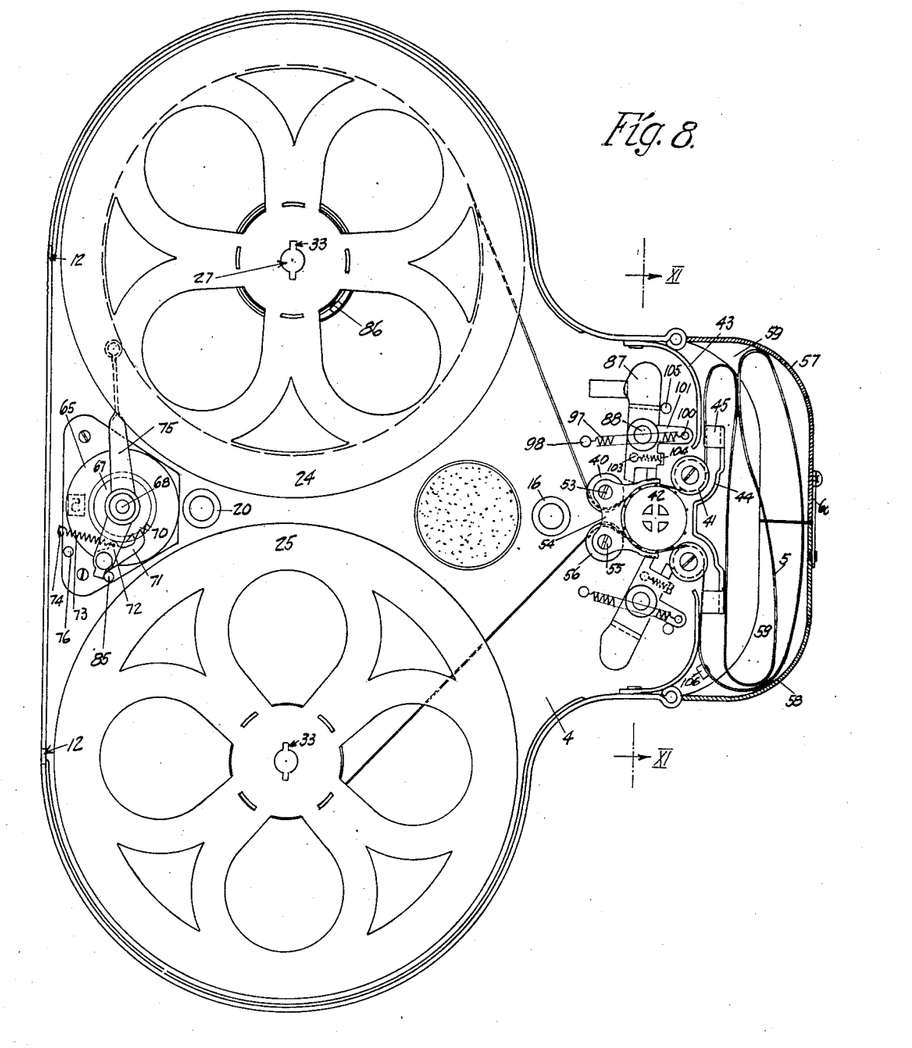
Fig. 8 is a detail elevational view of a film casing, the cover being removed.
Figure 9:
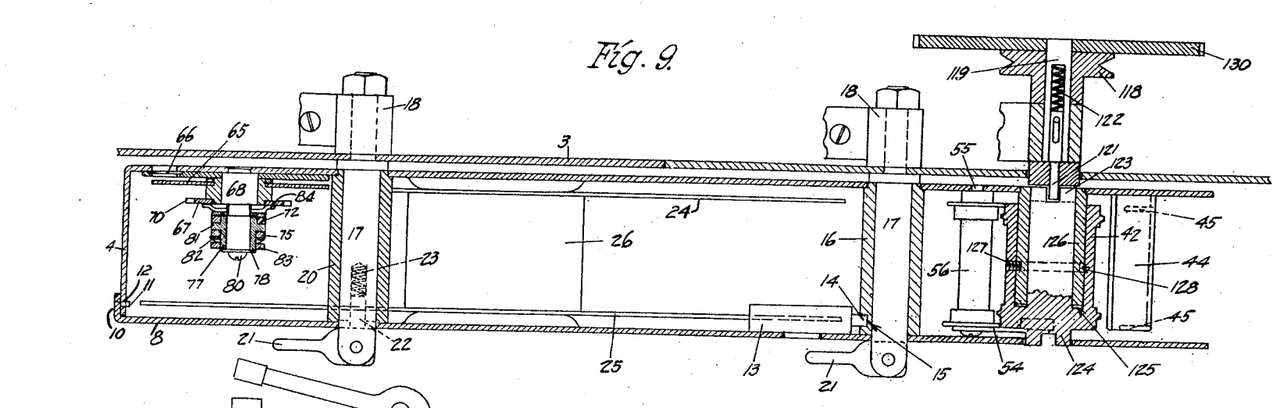

When the casing 4 is detached from the cabinet 2 the portions of the film which in use extend exteriorly of the casing 4 may be folded into it as shown in Fig. 8. A pair of closure members 57 and 58 hinged on the casing 4 have lateral flanges 59 which in closed position partially enclose the film in the pocket between the sprocket 42 and the doors 57 and 58. A latch 60 secures the closure members in this position.

The limitations of space within the casing 4 are such that the spools 24 and 25 can only move laterally a short distance within the casing 4 when it is in portable condition and consequently, the casing 4 can be readily assembled on the cabinet 2 the spindle 28 being threaded through the holes 29 in the casing and the apertures 27 in the spool 24. The spool 25 may be similarly assembled on a spindle 61.

The film 5 is of approximately double width and has two series 62 and 63 of pictures thereon, the order of the series in one strip being reversed with respect to the other. Accordingly after one series is exhibited, and the film 5 is wound up on the spool 25, it is unnecessary to rewind the film, but it may be withdrawn from the aperture gate 50 in an obvious manner and the casing 4 may be reversed in position. The film 5 may then be reintroduced behind the aperture gate 50 and the other series of pictures may be displayed.

Figure 1:
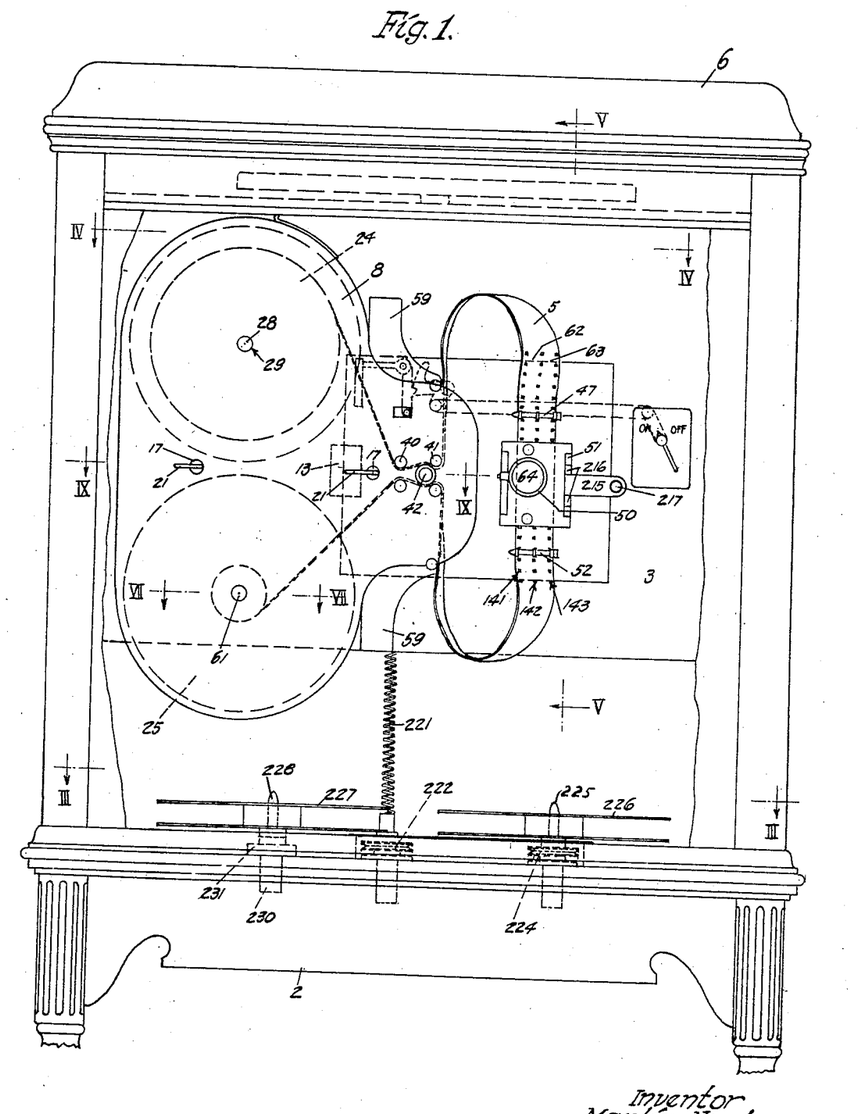
Figure 1 is a front elevational view of a machine embodying my invention, the front doors of the cabinet being broken away.

The lens 64 in the aperture gate 50 is centered with respect to the left hand series of pictures as viewed in Fig. 1.

The number of exhibitions of the film is automatically counted by mechanism including a dial 65 having numerals thereon which are brought into registry with a window 66 of isinglass or the like substance in the casing 4. The dial 65 is integral with a ratchet wheel 67 rotatably mounted on a stud 68 secured to the casing 4. The numerals on the dial may run from 1 to 24 and there is a corresponding number of teeth 70 on the ratchet wheel. These are engageable by a pawl 71 pivoted on an arm 72. A tension spring 73 connected to the pawl 71 and to a fixed lug 74 tends to move the arm 72 in a clockwise direction as viewed in Fig. 1. An arm 75 engages the film 5 on the spool 24 and as the film 5 unwinds the arms 72 and 75 are permitted to move in a clockwise direction. This continues until the pawl 71 falls behind the next succeeding tooth 70 of the ratchet wheel 67 and immediately thereafter the end of the arm 72 engages a stop 76. The film 5 continues to unwind without further movement of the arms 72 and 75.

When the operator reverses the casing 4 the film 5 is fed from the spool 25 to the spool 24 as previously described and during this operation the coils of film on the spool 25 are brought into engagement with the arm 75 moving it in a counter clockwise direction and advancing the ratchet wheel 67 an angular distance corresponding to a single tooth 70. This brings the next succeeding numeral on the dial 65 into registry with the window 66.

In order to adapt the counting device for use with films of different lengths, the arms 72 and 75 are made adjustable with respect to each other. For this purpose a sleeve 77 is provided which is retained on the stud 68 by a washer 78 which is secured by a screw 80.

The sleeve 77 has a collar 81 interposed between the arms 72 and 75. A washer spring 82 is compressed between the arm 75 and a ring 83 which is staked on the sleeve 77 or otherwise suitably secured.

The spring 82 forces the arm 72 against a washer 84 which is keyed on the stud 68 and prevents the clockwise movement of the arm 75 from being transmitted to the ratchet wheel 67.

When spools are first assembled in the casing 4 and it is desired to adjust the counting device in correspondence with the length of the particular film, the arm 72 is moved manually to an extreme counter clockwise position determined by a stop 85. The dial 65 is then moved to a zero reading and the arm 75 is moved in a clockwise direction until it engages the film. The spring 82 produces sufficient friction between the arms 72 and 75 to maintain them in predetermined relative position during the counting operation.

Devices are provided having the dual function of automatically stopping the projection machine after the exhibition of a picture strip and also of preventing the casing 4 from being assembled on the cabinet 2 with the wrong end of the casing disposed upwardly.

Figure 13:
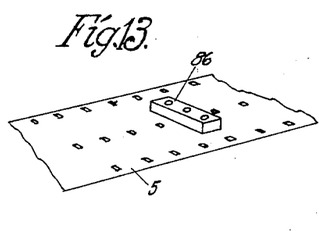
Fig. 13 is a detail view of a cleat (constituting part of the automatic switch opening mechanism) secured to a film, the latter being shown broken away.

A cleat 86 (Figs. 10 and 13) is secured to the film 5 near its point of attachment to the spool 24 and in the travel of the film 5 this is brought into engagement with a lever 87 mounted on a pivot 88. The lever 87 engages a pin 90 which extends through apertures 91 and 92 in the casing 4 and the panel 3 respectively. The pin 90 is carried by a switch lever 93 for closing contacts 94.

Figure 10:
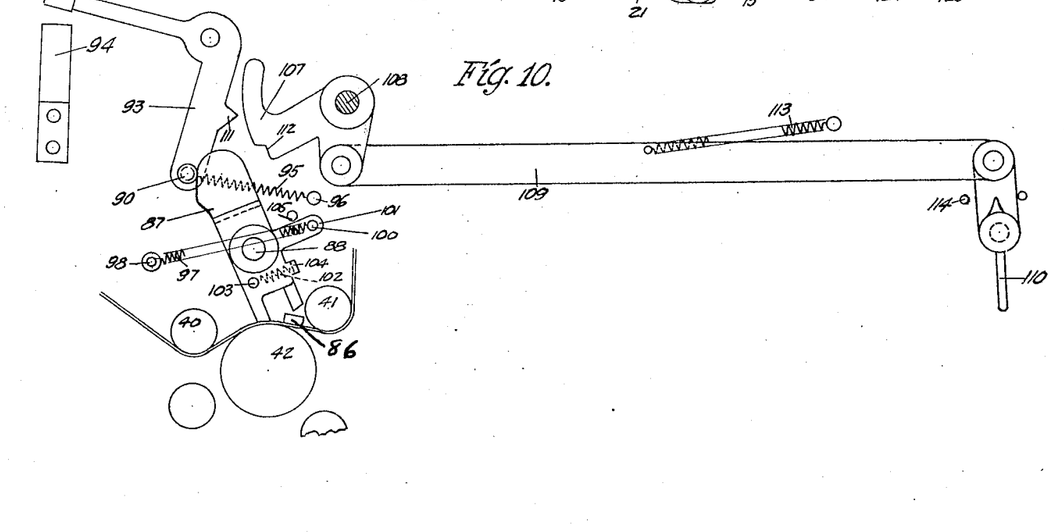
Fig. 10 is a diagrammatic view of automatic mechanism for opening a switch after the exhibition of a film.
Figure 11:
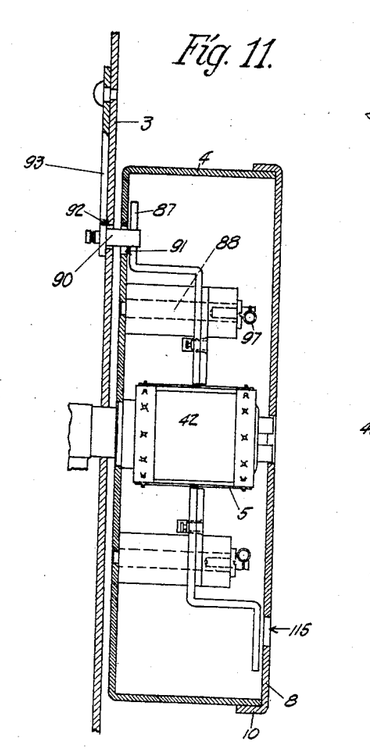
Fig. 11 is a sectional view taken on the line XI—XI of Fig. 8.

A tension spring 95 secured to the pin 90 and to a projection 96 on the panel which tends to hold the switch lever 93 in circuit closing position is counteracted by a tension spring 97 secured at 98 to the casing and at 100 to an arm of a bell crank lever 101 which turns on the pivot 88. A tension spring 102 is secured to a pin 103 on the lever 87 and to a lug 104 on the bell crank lever 101 and normally holds the lever 87 in engagement with the lug 104 (Figs. 8 and 10).

The extreme counter clockwise position of the lever 87 when engaged with the pin 90 is determined by the size of the aperture 91, in which the pin 90 moves but when the casing 4 is removed from the cabinet 2 the lever 87 moves forward till the bell crank lever 101 engages a stop 105 on the casing 4. At this time the end of the lever 87 completely closes the aperture 91 and consequently the casing can not be assembled with the cabinet in the position formerly occupied as the pin 90 cannot be inserted into the aperture 91. To assemble the casing 4 on the cabinet 2 it is therefore necessary to reverse it.

After reversal of the casing the lever 87 and associated parts occupy the position illustrated in Fig. 8 in connection with similar mechanism located on the opposite side of the sprocket drum 42. At this time the cleat 86 occupies the position of a similar cleat 106.

With the mechanism in this condition, when the movement of the film 5 is started the cleat 86 is guided towards the sprocket drum 42 and is brought into engagement with the end of the bell crank lever 101, the lug 104 on which rocks the lever 87. After the spring 97 passes the dead center position it snaps the lever 87 into engagement with the stop 105. This opens the aperture 91 so that on the completion of the cycle of operations including the display of both series 62 and 63 of pictures, the casing 4 may be again reversed and assembled in the position shown in Fig. 1.

If the casing should be improperly tampered with, as by the insertion of a tool into the aperture 91 when the lever 87 covers the aperture, it would be possible to swing the lever into the position shown in Fig. 8 but the spring 102 would at once return the lever to its previous position on the removal of the tool. This feature tends to make the apparatus fool proof.

When the lever 87 is in the position shown in Fig. 10 if the casing 4 is removed, the switch lever 93 is permitted to move slightly under the action of the spring 95. It does not however reach circuit closing position as it engages a cam 107 pivoted at 108 on the panel 3. The cam 107 is connected by a link 109 to a manual control lever 110 pivoted on the panel 3. When the lever 110 is moved in a counter clockwise direction after the casing 4 is assembled on the cabinet 2 the cam 107 is rocked until an ear 111 on the switch lever 93 which rides along the surface of the cam 107 drops into a notch 112 in the cam 107 thus closing the switch. When the switch lever 93 is moved to the position shown in Fig. 10 in the manner described, a tension spring 113 connected to the link 109 and to the panel 3 at once moves the cam 107 to the position shown in this figure, the limit of movement being determined by a stop 114 which is engageable by the lever 110.

The cover 8 has an aperture 115 therein for a purpose similar to aperture 91.

Figure 6:
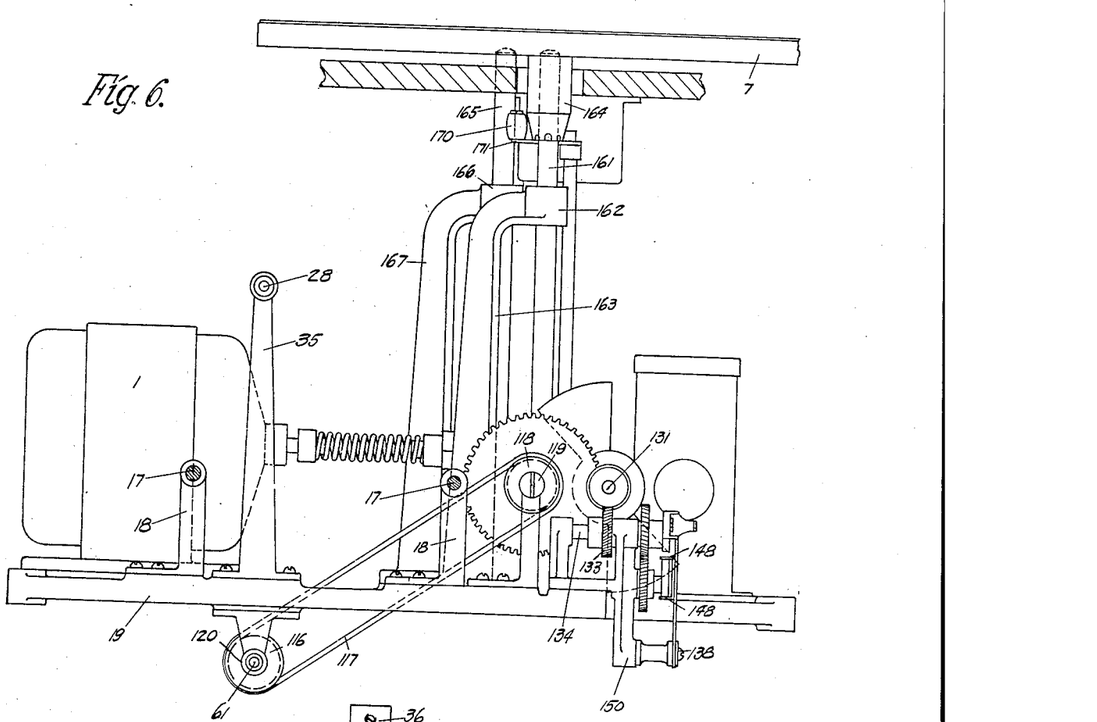
Fig. 6 is a sectional view taken on the line VI—VI of Fig. 5.
Figure 7:
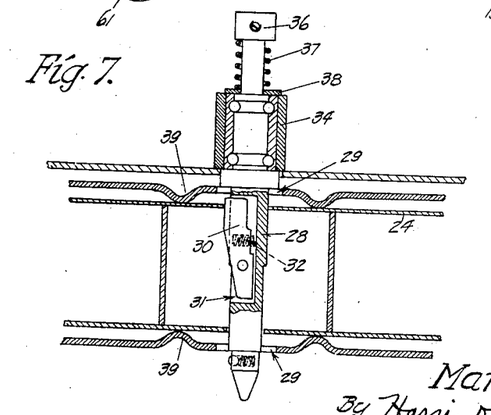

The spindle 61 on which the spool 25 (Fig. 1, 4 and 6) is mounted is similar to the spindle 28 except that it has no frictional retarding device but instead carries a pulley 116. A driving belt 117 which slips when the tension on the film reaches a certain degree and thus prevents breakage of the films extends from the pulley 116 to a pulley 118 on a shaft 119. The spindle 61 is journaled in a bearing 120 mounted on the base 19.

The shaft 119 has a clutch element 121 thereon which is forced outwardly by a spring 122. The sprocket drum 42 has clutch elements 123 and 124 thereon, one at each end for cooperating with the clutch element 121 and is provided with a recess 125 which receives a hollow bearing 126 secured to the casing 4. A screw 127 directed through the drum 42 into a circular recess 128 in the bearing 126 prevents axial movement of the drum 42.

Figure 5:
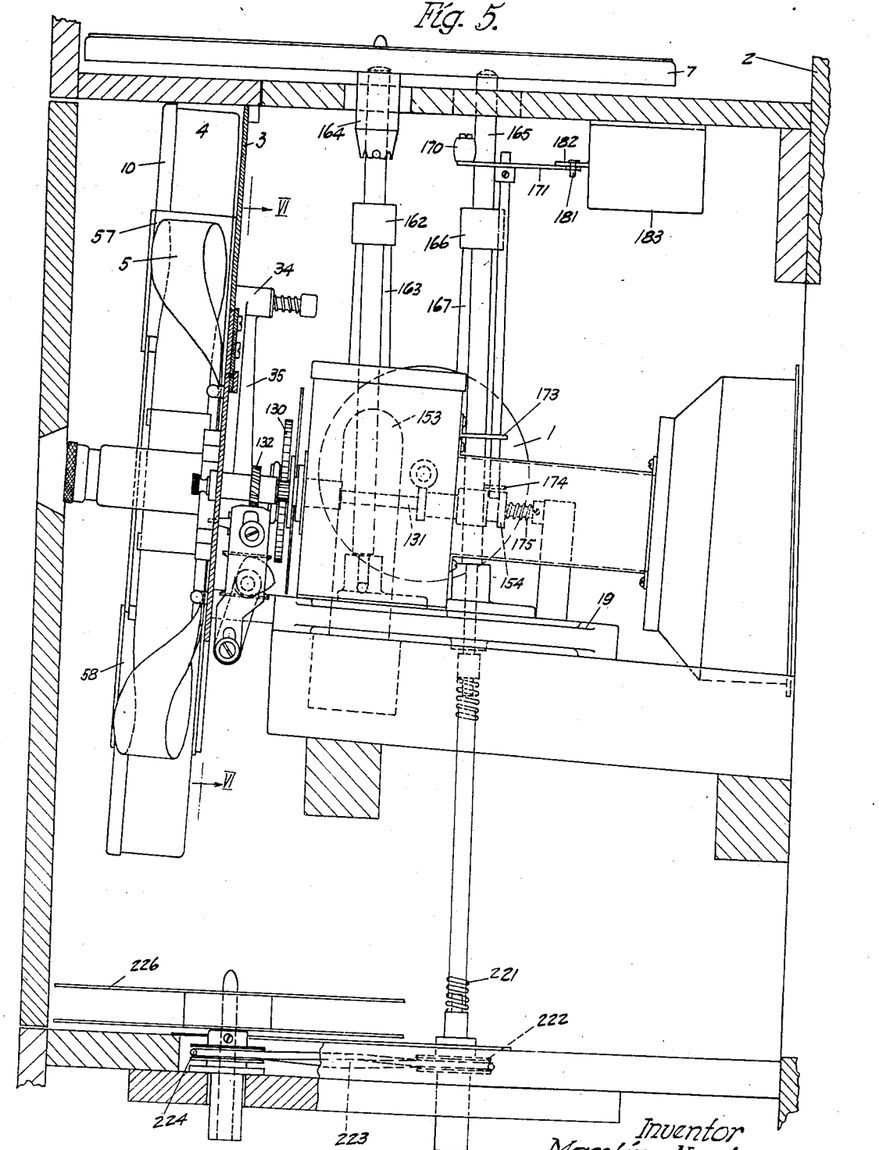

The shaft 119 has a gear 130 thereon which meshes with a pinion on a shaft 131 (Figs. 4, 5 and 6) carrying a gear 132 for operating intermittent film feed mechanism.

The gear 132 drives a gear 133 (Figs. 6 and 12) on a shaft 134 on which is mounted a cam 135 disposed between a pair of flanges on a lever 136. The lever 136 has a longitudinal guide slot 137 receiving a pivot 138 and carries a pair of claws 140 which are engageable in rows 141 and 142 of perforations in the film 5. The film 5 has also a row 143 of perforations and when it is reversed the claws 140 operate in rows 142 and 143. A gear 144 on the shaft 134 meshes with a gear 145 on a shaft 146 which carries a cam 147 positioned between flanges 148 on the lever 136 whereby a rapid longitudinal movement of the lever is produced. This assures a short pull down interval. A single casting 150 constitutes bearings for the shafts 134 and 146 and a support for the pivot 138.

The shaft 131 carries at its other end a fan 151 for circulating air through a ventilating conduit 152 in which a projection lamp 153 is housed. A clutch member 154 slidable on the shaft 131 is engageable with a clutch member 155 which is rigid with a gear 156 meshing with a gear 157 on a motor shaft 158.

For driving the turntable 7 at a relatively low speed say 33⅓ R. P. M. as an accompaniment to the exhibition reduction gearing 160 is provided which connects the motor shaft 158 to a spindle 161 journaled in a bearing 162 on a standard 163. The turntable 7 has a hub 164 removably mounted on the spindle 161.

Phonograph records can, however, be played independently of the projection mechanism and for this purpose a high speed spindle 165 is provided, journaled in a bearing 166 on a standard 167 and connected by gearing 168 to the motor shaft 158. The operator can lift the turntable bodily from the spindle 161 and place it on the spindle 165.

In the latter position the projection mechanism is inoperative. As the hub 164 is lowered it engages and moves a roller 170 (Figs. 2 and 6) on a lever 171 which is rigid with a rock shaft 172 (Figs. 4, 5 and 6) journaled in a bearing 173. Motion is thus transmitted to an arm 174 on the rock shaft which is connected to the clutch member 154 and the latter is moved against the action of a spring 175 into inoperative position.

Figure 15:
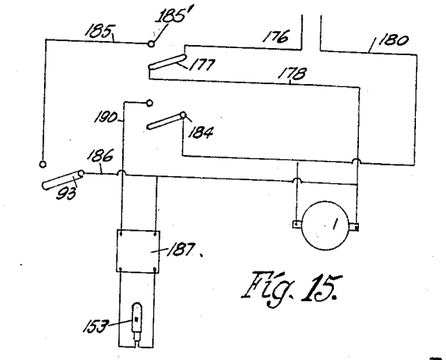
Fig. 15 is a diagram of the motor and projection lamp circuits.

At the same time current to the projection lamp 153 is cut off. Fig. 15 shows the position of the switches at this time. Current flows from a line conductor 176 through a switch 177 a conductor 178, the motor 1 and a line conductor 180.

Figure 2:
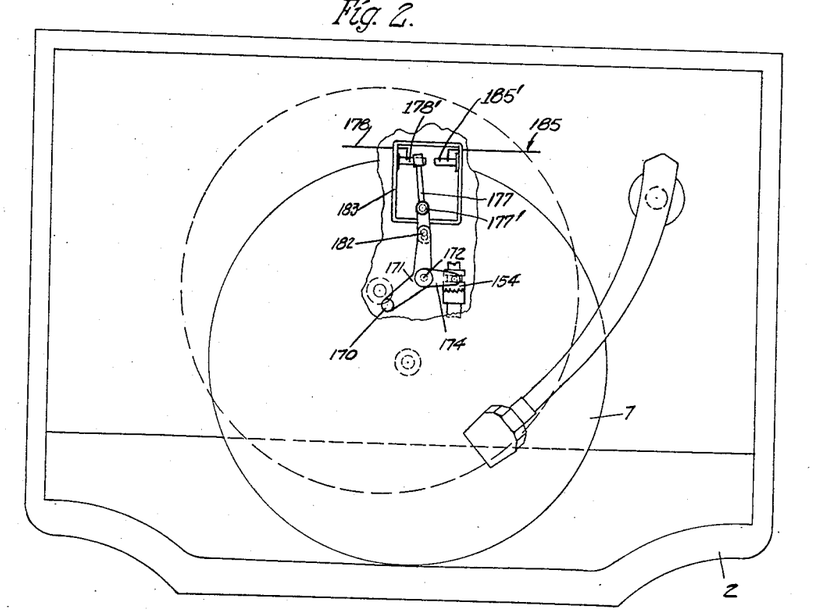
Fig. 2 is a plan view of the machine with the cover removed.
Figure 3:
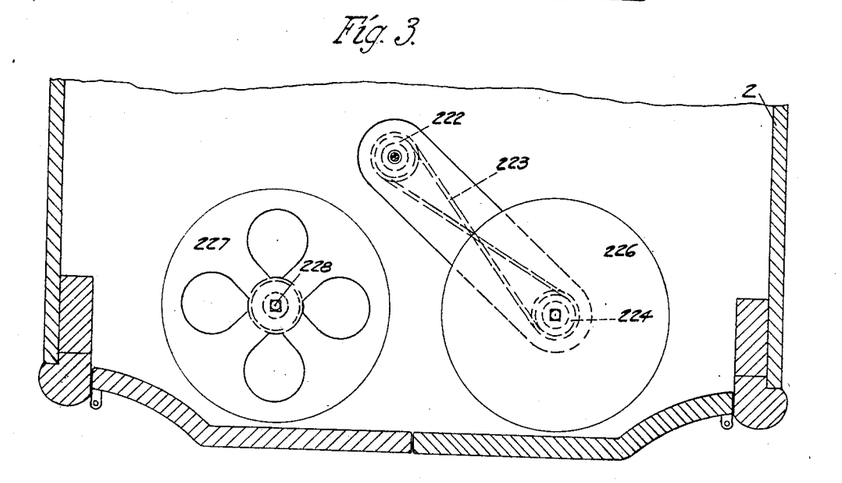
Fig. 3 is a sectional view on the line III—III of Fig. 1 the rear portion of the cabinet being broken away.

The lever 171 has a pin and slot connection 181 with a lever 182 in a box 183 which controls the switch 177 and a switch 184. This is shown in Fig. 2 wherein the switch 177, similar to the switch 184 not here illustrated, is mounted on shaft 177' and is movable to the right against contact 185' to close the circuit 185, and is movable to the left against contact 178' to close the circuit 178. Switch 184 is similarly mounted directly behind switch 177 on shaft 177' and operates in an obvious manner when these switches are shut to the right to close the circuits between lines 180 and 190.

When the turntable 7 is lifted from the spindle 165 the lever 171 is restored to its original position (Fig. 2) and if switch lever 93 is moved by manual control lever 110 to circuit closing position, current will travel from the line conductor 176 through the switch 177, a conductor 185, the switch lever 93, a conductor 186 a transformer 187 coupled to the projection lamp 153, a conductor 190 the switch 184 and the line conductor 180. The motor 1 is in parallel with respect to the transformer 187 and the switch 184.

If desired instead of using the casing 4 and the double film 5 described, a single film 191 may be substituted. For this purpose an adapter 192 (Figs. 16, 17 and 18) is provided which is located on the panel 3 by spacers 193 having reduced ends 194 which are received in holes 195. One of the studs 17 extends through a sleeve 196 for holding the adapter 192 securely in position. The square portions of the spindles 28 and 61 project through apertured bosses 197 on the adapter 192 and support the spools 198 and 200.

The film 191 is directed from the spool 198 onto a drum 201 by a guide 202. The guide 202 is mounted on a pivot 203 on which a torsion spring 204 is coiled, tending to force the guide 202 into the position shown in Fig. 17. A hollow roller 205 is mounted between flanges 206 on the guide 202 and receives a plunger 207 which is held in a perforation 208 by a spring 210. The plunger 207 may be retracted by a finger piece 211 to permit adjustment of the film 191 and may be swung upwardly until the plunger 207 is received in a perforation 212.

The sprocket drum 201 is journaled in a bearing 213 and connected to a shaft 219.

From the sprocket drum 201 the film 191 is directed upwardly into a loop by a guide 214 whence it is drawn past the aperture gate 50 by the intermittent feed mechanism described. Immediately adjacent the aperture gate 50 is a slide 215 which is movable laterally between guides 216 by means of a finger piece 217. The slide serves as an adjustable guide for both the single and double films.

After leaving the aperture gate 50 the film 191 is directed to the sprocket drum 201 by guides 218 and 220 similar to guides 202 and 214 respectively and is wound upon the spool 200 in the manner described in connection with the film 5.

For rewinding single films a flexible shaft 221 (Figs. 1 and 5) is employed which connects the spindle 165 to a pulley 222 mounted in the lower portion of the cabinet 2. A belt 223 extends from the pulley 222 to a pulley 224 on a spindle 225 for rotating a spool 226. A spool 227 from which the film is unwound is mounted on a spindle 228 which is journaled in a bearing 230 and has a collar 231 engaging a washer 232 of leather or other material suitable for producing a slight frictional action.

My invention is not limited to the specific details of the embodiment illustrated and described which may be modified extensively without departing from the spirit of the invention. For instance instead of the double film 5, two separate films could be used in the casing 4. These would be exhibited by reversing the casing in the manner described. A substantial range of equivalents is contemplated within the scope of the appended claims.

I claim as my invention:

1. In a picture projecting machine, the combination of a magazine, film spools therein, counting means secured to said magazine to be transported therewith including a member responsive to the movement of the film for indicating the number of times said film has been projected, and means for detachably securing the magazine to said projecting machine.

2. In a picture projecting machine, the combination of a magazine, a spool therein having a film thereon, means in said magazine for simultaneously feeding said film from said spool and preparing it to be refed, counting means secured to said magazine to be transported therewith including a member responsive to the amount of the film on said spool for indicating the number of times said film has been projected, and means for detachably securing said magazine to the projecting machine.

3. In a picture projecting machine, the combination of a magazine, a pair of spools therein having two series of pictures wound thereon, one of said series of pictures being reversed with respect to the other, means for feeding said series of pictures simultaneously in the same direction and for projecting one of said series of pictures, means for winding said series of pictures on one of said spools as it is unwound from the other, counting means secured to said magazine to be transported therewith including a member actuable directly by the movement of said picture series for indicating the number of times one of said picture series has been projected, and means for reversibly securing said magazine to said projecting means to permit said magazine to be reversed after the projection of one of said picture series so that the other of said picture series may be projected.

4. In a picture projecting machine, the combination of a casing, a pair of spools completely enclosed thereby having two series of pictures thereon side by side, one of said series of pictures being reversed with respect to the other, means for feeding said picture series simultaneously in the same direction and for projecting one of said series of pictures, means for winding said picture series on one of said spools as it is unwound from the other, counting means secured within said casing to be transported therewith including a member actuable directly by the movement of said picture series for indicating the number of times one of said picture series has been projected, and means for reversibly securing said casing to said projecting means to permit said casing to be reversed after the projection of one of said series of pictures so that the other series may be projected.

5. In a picture projecting machine, the combination of a casing, a pair of spools enclosed thereby having two series of pictures thereon, one of said series of pictures being reversed with respect to the other, means in said casing for feeding said picture series simultaneously in the same direction from one of sa'd spools, means exterior of said casing for driving the first mentioned means and for projecting one of said series of pictures, means operable by the second mentioned means for rotating one of said spools and thereby winding up said picture series, the first mentioned means being operative to advance the projected portion of said one of said picture series and also the other thereof to said one of said spools, means for reversibly supporting said casing whereby said ser'es may be projected one after the other, and counting means on said casing automatically operable by the movement of said picture series to indicate the number of times a series of pictures has been projected.

6. In a picture projecting machine, the combination of a casing, a spool therein having a film thereon extending exteriorly of said casing, means exterior of said casing for projecting the pictures on said film, said means including a light aperture and means for guiding said film past sa'd aperture, said film extending back into said casing from said aperture, means in said casing for winding said film to prepare it for projection immediately after the entire length of film has passed said aperture, counting means on said casing for indicating the number of times said film has been projected, and means for detachably securing said casing to the projecting machine.

7. In a picture projecting machine, the combination of a magazine, means for detachably securing said magazine to the projecting machine, said magazine comprising a pair of spools having a film extending from one to the other, electrically operable means detachable from said spools for winding said film off one of said spools and onto the other and for projecting the record on said film, means for detachably securing said spools to said electrically operable means, said electrically operable means including a power control switch, a member in said magazine and movable to actuate said switch and move it to "off" position, means operable by the movement of said film to actuate said member, and an automatic guard for preventing said magazine from being placed on the projector with an empty spool in film feeding position.

8. In a picture projecting machine, the combination of a casing, a pair of spools therein having film with a pair of picture series extend'ng from one spool to the other, one of the series of pictures being reversed with respect to the other, means for feeding and rewinding said film, means for projecting one of said picture series, means for reversibly securing said casing to the first mentioned means to permit the projection of one series after the other, and a film controlled guard for preventing said casing from being assembled with respect to the first mentioned means with an empty spool in film feeding position.

9. In a picture projecting machine, the combination of a magazine, a pair of spools in said magazine having film with a pair of picture series extending from one to the other, one of the series of pictures being reversed with respect to the other, electrically operable means for unwinding said film from one of said spools and winding it on the other, means for projecting one of said picture series, said means including a power control switch, means operable by the movement of said film after the projection of the last mentioned one of said series to move said switch to "off" position and stop the operation of said electrically operable means, means for reversibly securing said magazine to said electrically operable means to permit the projection of the other series, the third mentioned means also being operable by the movement of said film after the projection of the last mentioned other series to move said switch to "off" position, and a film controlled guard for preventing said magazine from being assembled with said electrically operable means excepting w.th the wound up film in position for beginning the projecting operation.

10. In a picture projecting machine, the combination of a magazine, a film counter therefor comprising counting mechanism having a movable member, a film spool upon which film is adapted to be wound and from which film is adapted to be unwound, means for mounting said member to rest upon the film wound on said spool, means whereby said member is adapted to actuate said counting mechanism when the amount of film on said spool reaches a predetermined amount to count the number of projections of the film, and means for detachably connecting said magazine to the picture projecting machine.

11. In a picture projecting machine, the combination of a magazine, a film counter therefor comprising a counting device, operating mechanism for said device, an actuating device for said operating mechanism, a film spool in said magazine having film thereon, the position of said actuating device being responsive to the amount of film on said spool to count the number of projections of the film, means for varying the relation between said actuating device and said operating mechanism to count the number of projections of films of different lengths, and means for detachably securing said magazine to the projecting machine.

12. In a picture projecting machine, the combination of a film magazine comprising a pair of film spools at one side of said magazine, a pocket at the other side of said magazine for storing a loop of film from said spools, means for supporting said spools for rotation about separated axes a single supply and take-up sprocket between said spools and said pocket for feeding film from one of said spools to said pocket and for removing film from said pocket to the other of said spools, means for opening said pocket to permit access to said loop, and means for detachably securing said magazine to the projecting machine.

13. In a picture projecting machine, the combination of a film magazine comprising a pair of film spools at one side of said magazine, a pocket at the other side of said magazine for storing a loop of film from said spools, a supply and take-up spocket between said spools and said pocket for receiving and feeding film from one of said spools to said pocket and for receiving and removing film from said pocket to the other of said spools, means for opening said pocket to permit access to said loop, film guides between said sprocket and said pocket, and means for detachably securing said magazine to the projecting machine.

14. In a film machine, the combination of a magazine, film spools therein, film on said spools and having a plurality of laterally disposed series of records, counting means secured to said magazine for counting the number of record reproductions from said film, and means for detachably securing said magazine to the machine in a plurality of different positions each of which is adapted to permit the reproduction of one of said series of records.

15. In a film machine, the combination of a magazine, film spools therein, film on said spools and having two laterally disposed series of records one of which is reversed with respect to the other, counting means secured to said magazine for counting the number of record reproductions from said film, and means for detachably securing said magazine to the machine in reversible positions to permit the reproduction of each of said series of records.

16. In a picture projecting machine, the combination of a magazine, film spools therein, film on said spools and having a plurality of laterally disposed series of pictures, counting means secured to said magazine for counting the number of film projections, means for detachably securing said magazine to the projecting machine in a plurality of different positions each of which is adapted to permit the projection of one of said picture series, and means mounted on said magazine for determining the proper position of said magazine on the projecting machine with reference to the particular series of pictures which is in position to be projected.

17. In a film machine, the combination of a magazine, film spools therein, film on said spools and having two laterally disposed series of records one of which is reversed with respect to the other, counting means secured to said magazine for counting the number of record reproductions, means for detachably securing said magazine to the reproducing machine in reversible positions to permit the reproduction of each of said series of records, and guarding means cooperatively associated with said magazine and with the reproducing machine for preventing assembly of said magazine on the reproducing machine in improper position for reproduction of said film.

18. In a picture projecting machine, the combination of a magazine, film spools therein, film on said spools and having two laterally disposed series of pictures one of which is reversed with respect to the other, means for detachably securing said magazine to the projecting machine in reversible positions to permit the projection of each of said picture series, and guarding means cooperatively associated with said magazine and with the projecting machine for preventing an empty spool in said magazine from being placed on the projecting machine in film feeding position.

19. In a film machine, the combination of a magazine, a pair of film reels therein, each having detachable drive couplings at opposite sides thereof, a friction spindle and a driving spindle on the machine and spaced apart the same distance as the centers of said reels, and means whereby said magazine may be reversibly mounted on the machine, and either of said reels engaged with said driving spindle, the alternate reel being engaged with said friction spindle.

20. In a picture projecting machine, the combination of a magazine, a pair of film reels therein, each having detachable drive couplings at opposite sides thereof, a pair of spaced sleeves mounted in said magazine, a pair of locking studs on the projecting machine and spaced apart the same distance as said sleeves, a friction spindle and a driving spindle on the projecting machine and spaced apart the same distance as the centers of said reels, whereby said magazine may be reversibly mounted on said locking studs, and either of said reels engaged with said driving spindle, the alternate reel being engaged with said friction spindle.

21. In a film machine, the combination of a magazine, a pair of film reels therein, each having detachable drive couplings at opposite sides thereof, a friction spindle and a driving spindle on the projecting machine and spaced apart the same distance as the centers of said reels, means whereby said magazine may be reversibly mounted on the machine and either of said reels engaged with said driving spindle, the alternate reel being engaged with said friction spindle, a switch on the machine and a film-operated switching device carried by said magazine and detachably engageable with said switch.

22. In a picture projecting machine, the combination of a magazine, a pair of film reels therein, each having detachable drive couplings at opposite sides thereof, a friction spindle and a driving spindle on the projecting machine and spaced apart the same distance as the centers of said reels, means whereby said magazine may be reversibly mounted on the projecting machine and either of said reels engaged with said driving spindle, the alternate reel being engaged with said friction spindle, a switch on the projecting machine, and a film-operated switching device at opposite sides of said magazine and detachably engageable with said switch.

MARTIN NYSTROM.